United States Patent
Pereira da Silva Araujo

(10) Patent No.: US 10,518,448 B2
(45) Date of Patent: Dec. 31, 2019

(54) ADDITIONAL INJECTION MODULAR SYSTEM

(71) Applicant: PLASDAN—AUTOMACAO E SISTEMAS, LDA., Marinha Grande (PT)

(72) Inventor: Paulo Juliano Pereira da Silva Araujo, Marinha Grande (PT)

(73) Assignee: PLASDAN-AUTOMACAO E SISTEMAS, LDA., Marinha Grande (PT)

( * ) Notice: Subject to any disclaimer, the term of this patent is extended or adjusted under 35 U.S.C. 154(b) by 171 days.

(21) Appl. No.: 15/326,589

(22) PCT Filed: Jul. 15, 2015

(86) PCT No.: PCT/IB2015/055359
§ 371 (c)(1),
(2) Date: Jan. 16, 2017

(87) PCT Pub. No.: WO2016/009370
PCT Pub. Date: Jan. 21, 2016

(65) Prior Publication Data
US 2017/0210046 A1    Jul. 27, 2017

(30) Foreign Application Priority Data
Jul. 15, 2014   (PT) .......................................  107766

(51) Int. Cl.
*B29C 45/47*  (2006.01)
*B29C 45/62*  (2006.01)
(Continued)

(52) U.S. Cl.
CPC ........ *B29C 45/1606* (2013.01); *B29C 45/281* (2013.01); *B29C 2045/1685* (2013.01);
(Continued)

(58) Field of Classification Search
CPC ........ B29C 2045/1685; B29C 45/1742; B29C 45/1744
See application file for complete search history.

(56) References Cited

U.S. PATENT DOCUMENTS 5,494,433 A *   2/1996   Gellert ................ B29C 45/2735
                                                   264/297.2
2006/0156978 A1* 7/2006   Lipson .................... A61L 27/36
                                                   118/708
(Continued)

FOREIGN PATENT DOCUMENTS

DE        4021856 A1    1/1991
DE        19956898 C1   4/2001
(Continued)

OTHER PUBLICATIONS

International Search Report dated Oct. 9, 2015 for PCT/IB2015/055359.
Written Opinion dated Oct. 9, 2015 for PCT/IB2015/055359.

*Primary Examiner* — Joseph S Del Sole
*Assistant Examiner* — Thu Khanh T Nguyen
(74) *Attorney, Agent, or Firm* — Lucas & Mercanti, LLP

(57) ABSTRACT

Additional injection modular system applicable in any process for molding parts or products by polymer injection is provided, wherein injecting one or more parts or products with a single material or a plurality of polymer materials requiring separate, simultaneous or sequential complementary injections becomes necessary in addition to the injection of a base material processed in a conventional injection machine. The system has a module configurable in both composition and dimension with optimized rheological and energy behavior which is installed between the closure assembly plates of the base machine and the mold, comprising a frame, front mold clamping plate, structure clamping plate, structure spacer blocks, at least one additional (Continued)

injection assembly, at least one additional injection nozzle and injection nozzle extension. The system herein can be used in the production of parts by injection processes generally designated as multi-component injection.

12 Claims, 17 Drawing Sheets

(51) Int. Cl.
*B29C 45/16* (2006.01)
*B29C 45/28* (2006.01)
*B29K 105/00* (2006.01)

(52) U.S. Cl.
CPC ............... *B29C 2045/2837* (2013.01); *B29K 2105/0067* (2013.01)

(56) References Cited

U.S. PATENT DOCUMENTS

| | | | | |
|---|---|---|---|---|
| 2011/0316191 | A1* | 12/2011 | Di Simone | B29C 45/1603 264/255 |
| 2013/0004607 | A1* | 1/2013 | Hoechsmann | B22F 3/1055 425/112 |

FOREIGN PATENT DOCUMENTS

| | | |
|---|---|---|
| DE | 102007018265 A1 | 10/2008 |
| JP | S5669137 A | 6/1981 |
| JP | H10128796 A | 5/1998 |
| WO | 2012000111 A1 | 1/2012 |

\* cited by examiner

A)

B)

C)

D)

ADDITIONAL INJECTION MODULAR SYSTEM

CROSS REFERENCE TO RELATED APPLICATION

This Application is a 371 of PCT/IB2015/055359 filed on Jul. 15, 2015, which claims priority of Portuguese Application No. 107766 filed Jul. 15, 2014, both of which are incorporated herein by reference.

TECHNICAL FIELD

The present application describes an additional injection modular system.

BACKGROUND

Injection processes of parts or sets of parts requiring simultaneous or sequential injection of more than one material or details, which despite being of the same material, cannot be executed by the injection assembly of the base machine, involve the need for additional injection.

These processes known in the art involve the use of other additional injection systems, in addition to the injection assembly of the base injection machine. Mounting and connecting these additional injection assemblies involve several installation problems, often requiring significant additional space around the main machine.

Another significant limitation of additional injection systems known in the art relates to security issues. Installation and connection thereof to mold inlets often come into conflict with construction details of the base injection machine, particularly with doors and protective shields, thus becoming necessary to both remove security items originally installed in the machine and install additional shields around the systems.

Other types of limitations relate to mechanical stability of assemblies on machinery and molds that give rise to the need for making and using special supporting structures, resulting in significant room problems.

Another limitation is that current additional injection systems also greatly interfere with automation/robot control requirements necessary to the extraction or mounting of parts produced by the mold, due to the room they take up outside the injection machine and mold. When the base machine is used in a flexible manner to produce other parts which do not require additional injection or which involve other additional injections, dismounting these components is always a time consuming and often complex operation and its volumetric hampers handling and subsequent storage thereof.

Moreover, mounting additional peripheral injection groups usually involves long distance flow channels, with the inherent energy and rheological inconveniences.

Finally, another limitation often found is that considerable amounts of melted raw material are lost in the abutment regions between the nozzle of the additional injection unit and the mold, during the injection process with the abutment and retraction of the nozzle, which causes the melted raw material to accumulate in areas that eventually compromise a proper operation of the mold.

In a conventional system, each complementary injection equipment assembly would be installed outside the machine with connections to the mold from the outside thereof, in a position dependent on the inlets defined for additional injection, on many ways associated with size of complementary units, on construction details of the molds and on the primary injection machine itself, as illustrated in sections A), B), C) or D) in FIG. 18, as an independent unit attached to the mold from the outside. One solution would be integrating components which enable the process of complementary or additional injection into the mold itself, which requires that the design, constitution and construction thereof be limited by room reservation on the inside in order to accommodate said components, which tend to be exclusively dedicated to a single mold, meaning that the flexibility in the use thereof for other injection processes is lost.

SUMMARY

The present application describes an additional injection modular system comprising a module configurable in size and composition with optimized energy and rheological behavior, which is installed between the plates of the base machine closure assembly and the mold and comprising:
  a metal structure;
  front mold clamping plate;
  structure clamping plate;
  structure spacer blocks;
  at least one additional injection assembly;
  at least one additional injection nozzle;
  injection nozzle extension.

In one embodiment, the inlet of the injection nozzle extension of the additional injection modular system is arranged in the middle of the structure clamping plate.

In another embodiment, the structure clamping plate of the additional injection modular system is clamped by a system centering ring.

In yet another embodiment, the structure spacer block assembly of the additional injection modular system is positioned and clamped to the structure clamping plate.

In one embodiment, the additional injection assembly of the additional injection modular system is located between the structure spacer block assembly, the structure clamping plate and the front mold clamping plate.

In another embodiment, the mold of the additional injection modular system is installed between the stationary plate of the main injection machine and the movable plate of said main injection machine.

In yet another embodiment, the mold of the additional injection modular system is positioned so as to be guided by the existing rings in the additional and main injection points.

In one embodiment, the additional injection assembly of the additional injection modular system is installed in voids formed between the structure spacer block assembly, the structure clamping plates and the front mold clamping plate.

In another embodiment, the additional injection assembly of the additional injection modular system consists of an additional extruder and an additional injection unit of the piston accumulator type.

In yet another embodiment, the additional dispenser block of the additional injection modular system comprises an injection valve assembly.

In one embodiment, the additional injection modular system comprises at least one cleaning valve which diverts the material within the extruder to a discharge pipe.

In another embodiment, the extruder of each additional injection assembly of the additional injection modular system comprises:
  an additional extruder motor;
  an additional extruder gearbox;
  an axial load support bearing housing and spindle rotation support;

an additional extruder spindle;

In yet another embodiment, the additional injection unit of the additional injection modular system comprises a piston accumulator.

In one embodiment, the piston accumulator of the additional injection modular system comprises a chamber with a cylindrical bore and a piston.

In another embodiment, the injection cycle 3-way valve of the additional injection modular system has radial bores which, according to its angular position, allow communication from the extruder outlet dispensing channel to the injection cycle valve through the extruder outlet dispensing channel.

In yet another embodiment, the additional injection nozzle of the additional injection modular system comprises a hot nozzle support for secondary polymer component injection heated by a heating resistor.

In one embodiment, the injection nozzle extension of the additional injection modular system comprises:
system centering ring;
support for injection nozzle extension;
pre-tensioning spring of injection nozzle extension;
injection nozzle extension.

In another embodiment, the additional injection nozzle of the additional injection modular system is further provided with at least an interposed spring closed by the secondary injection nozzle centering ring in order to move axially.

The present application further describes the use of the additional injection modular system for the production of parts by injection in processes generally designated as multicomponent injection, being applied in any thermoplastic molding process.

General Description

The present application describes an additional injection modular system intended for application in any process for molding parts or products by thermoplastic polymer injection, wherein injecting at least two materials is necessary, or in case of parts or products consisting of a single material and having molding details requiring separate, simultaneous or sequential complementary injections in addition to the injection of a base material processed in a conventional injection machine.

Examples of such applications are the injection of parts or part details with at least two materials or with the same material but having different colors, co-injection and multilayer processes and welding processes for joining different parts injected during the same injection cycle.

The additional injection modular system further comprises a module including a set of components intended to produce thermoplastic materials in injection molding systems which require secondary injections thus supplementing a standard injection machine in the production of parts composed of at least two materials, colors or various components injected simultaneously or sequentially in the same injection cycle, generally known as multi-component systems. Said module shall be installed between the plates of the base machine closure assembly and the mold itself. This module can be used in multiple machines or molds, it being only required that additional injection outlets thereof are compatible with the positioning of the respective inlets in the mold. Through the combination and arrangement of devices integrated in the module, this module can be tailored to different injection systems.

The system herein presented is dimensionally compatible with the closure units defined by EUROMAP and SPI.

The technology herein presented provides the following advantages:

it is modular and adaptable to molds and injection machines to produce parts with different additional injection needs;

the system overcomes the disadvantages inherent to mounting additional groups from the outside of the main machine or on molds, thus eliminating interference with doors and shielding of the main machine, which must often be removed or modified;

the interference situations with robots or other peripherals integrated in the production process are eliminated;

the need for special platforms or structures to support additional injection assemblies surrounding the main injection machine is eliminated;

the work of mold designers is simplified, as in the design phase they will be able to decide the best positioning of the injection point/raw material inlet in the injection modular system to the system of hot mold channels, thus avoiding more complex channel systems into the mold;

The mold designer will only have to define the inlet points of melt material in the first mold plate according to the injection points defined for the chosen model of additional injection modular system;

injection paths are substantially reduced with rheological and energy benefits;

the composition of the modules may be adapted in view of the production capacities as required;

the system comprises a set of elements for additional injections with smaller volume of space used and no mechanical stability problems, i.e. without vibrations;

simple mounting and dismounting. These operations are now equivalent to mounting and dismounting of a simple mold in and from base injection machine plates;

installing and uninstalling complementary injection systems are substantially simplified;

module design is according to the dimensional standards established by EUROMAP or SPI;

the technology's modular shape enables adapting it to injection processes requiring injections applied onto central bodies of molds with more than one opening plane, the injections allowing an orientation in more than one direction in opposite planes parallel to main machine planes.

BRIEF DESCRIPTION OF THE FIGURES

For an easier understanding of the technique, drawings are herein attached, which represent preferred embodiments and which, however, are not intended to limit the scope of the present application.

Figure 6:
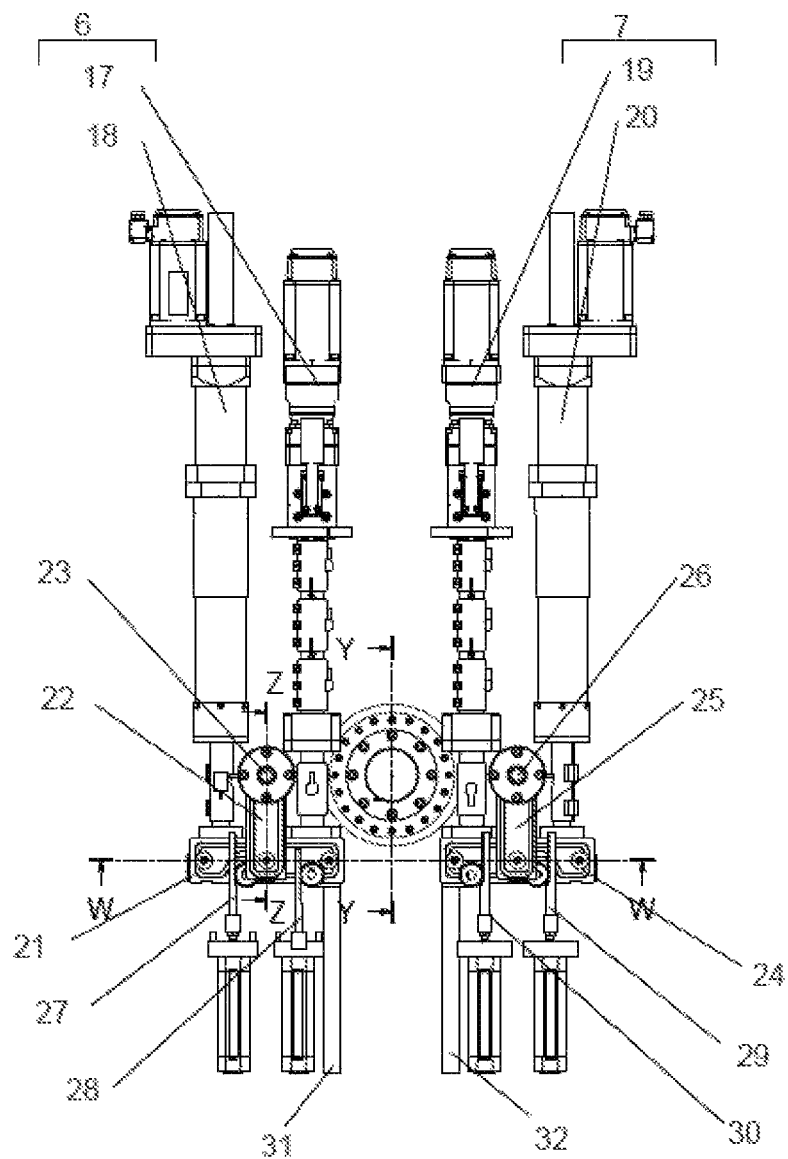
FIG. 6 shows a composition similar to that shown in FIG. 5, isolated from the structure, wherein reference numbers represent:
- 6—additional injection assembly for polymer component B;
- 7—additional injection assembly for polymer component C;
- 17—additional extruder for polymer component B;
- 18—additional injection unit for polymer component B;
- 19—additional extruder for polymer component C;
- 20—additional injection unit for polymer component C;
- 21—additional dispenser block for polymer component B;
- 22—polymer component B dispenser;
- 23—injection nozzle assembly for polymer component B;
- 24—additional dispenser block for polymer component C;
- 25—polymer component C dispenser;
- 26—injection nozzle assembly for polymer component;
- 27—injection valve assembly for polymer component B;
- 28—cleaning valve assembly for polymer component B;
- 29—injection valve assembly for polymer component C;
- 30—cleaning valve assembly for polymer component C;
- 31—cleaning discharge pipe B;
- 32—cleaning discharge pipe C.
Figure 10:
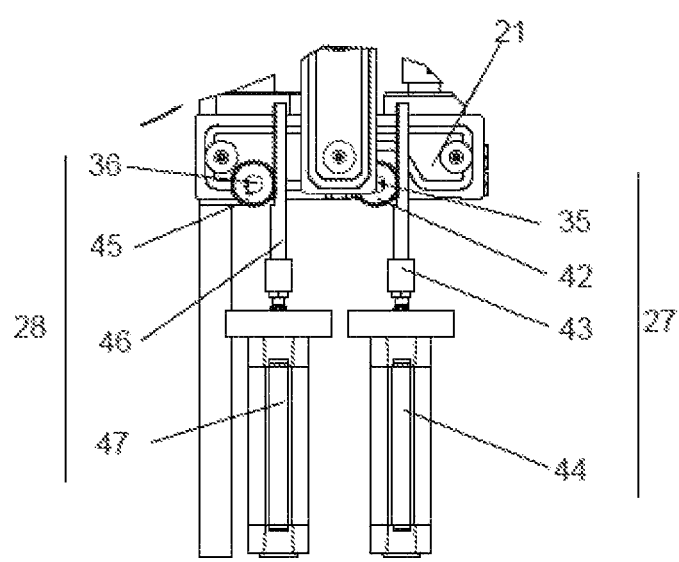
Figure 11:
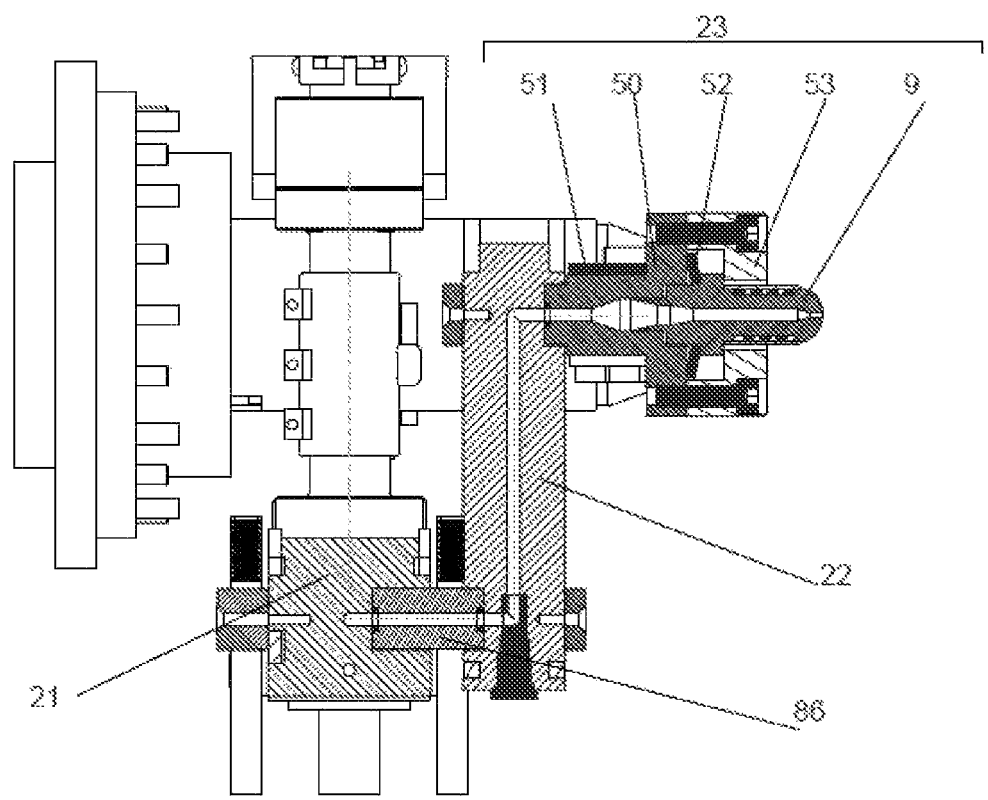

6—additional injection assembly for polymer component B;
17—additional extruder for polymer component B;
18—additional injection unit for polymer component B;
21—additional dispenser block for polymer component B;
31—cleaning discharge pipe B;
35—valve rotor of the injection cycle;
36—cleaning discharge valve rotor;
37—injection unit outlet dispensing channel;
38—extruder outlet dispensing channel for injection cycle valve;
39—additional injection outlet dispensing channel;
40—extruder outlet dispensing channel;
41—cleaning discharge dispensing channel;

FIG. 10 shows a detail of the outer appearance of the additional injection cycle control dispenser, including the control of valves integrated therein, wherein reference numbers represent:

21—additional dispenser block for polymer component B;
27—injection valve assembly for polymer component B;
28—cleaning valve assembly for polymer component B;
35—valve rotor of the injection cycle;
36—cleaning discharge valve rotor;
42—rotation pinion of additional injection cycle valve;
43—rotation rack of additional injection cycle valve;
44—rotation actuator of additional injection cycle valve;
45—cleaning valve rotation pinion;
46—cleaning valve rotation rack;
47—cleaning valve rotation actuator;

FIG. 11 is a section along plane Z-Z in FIG. 6 showing the injection nozzle assembly and connection dispensers of one additional injection included in one exemplary system, wherein reference numbers represent:

9—injection nozzle for polymer component B;
21—additional dispenser block for polymer component B;
22—polymer component B dispenser;
23—injection nozzle assembly for polymer component B;
50—hot nozzle support for secondary polymer component injection;
51—heating resistor for hot nozzle support for secondary polymer component injection;
52—pre-tensioning spring of injection nozzle abutment for secondary polymer component injection;
53—secondary injection nozzle centering ring;
86—Connection tube to additional dispenser block, polymer component C, polymer component dispenser C.

Figure 12:
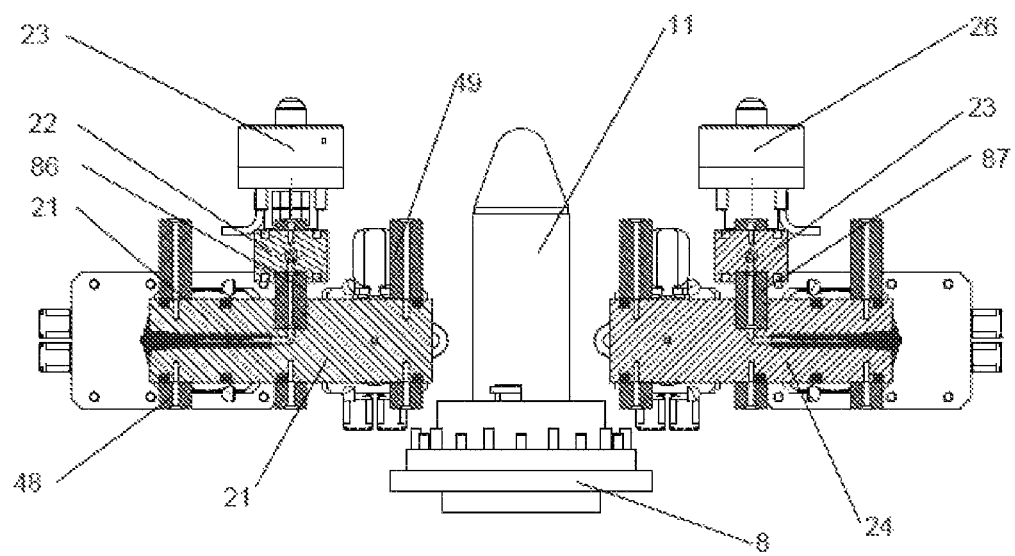
Figure 13:
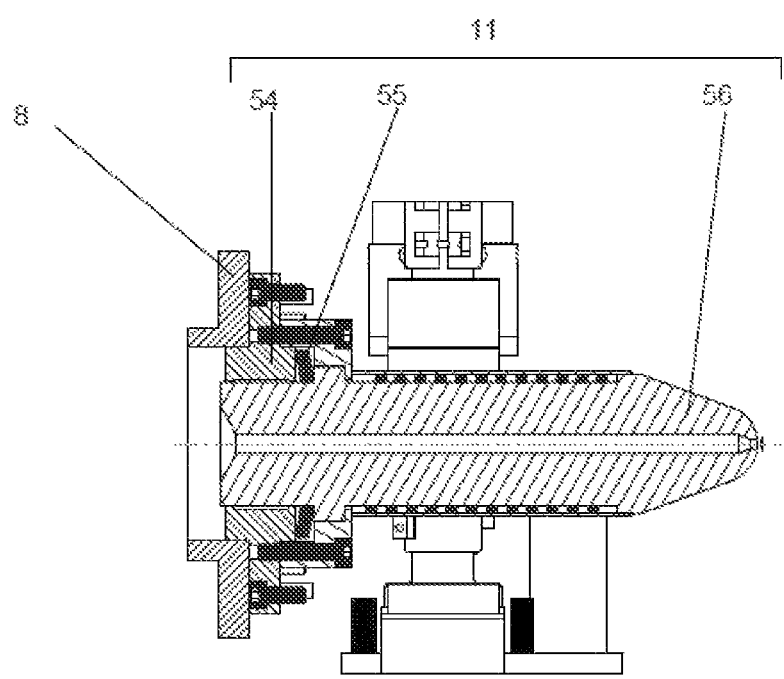

FIG. 12 is a section along plane W-W in FIG. 6, showing the exemplary mounting detail for the injection nozzle assembly, with two additional injection points for the additional polymer components B and C, showing the section along the connection control dispensers to the respective dispensers of polymer components, wherein reference numbers represent:

8—system centering ring;
11—injection nozzle extension for polymer component A;
21—additional dispenser block for polymer component B;
22—polymer component B dispenser;
23—injection nozzle assembly for polymer component B;
24—additional dispenser block for polymer component C;
26—injection nozzle assembly for polymer component;
48—supporting column;
49—supporting column;
86—Connection tube to additional dispenser block, polymer component C, polymer component dispenser C;
87—inlet ring for polymer component B injection into the mold;

FIG. 13 is a section view along Y-Y in FIG. 6 showing the nozzle extension system for polymer material A main injection, wherein reference numbers represent:

8—system centering ring;
11—injection nozzle extension for polymer component A;
54—injection nozzle extension support for polymer component A;
55—pre-tensioning spring of injection nozzle extension for polymer component A;
56—injection nozzle extension for polymer component A.

Figure 1:
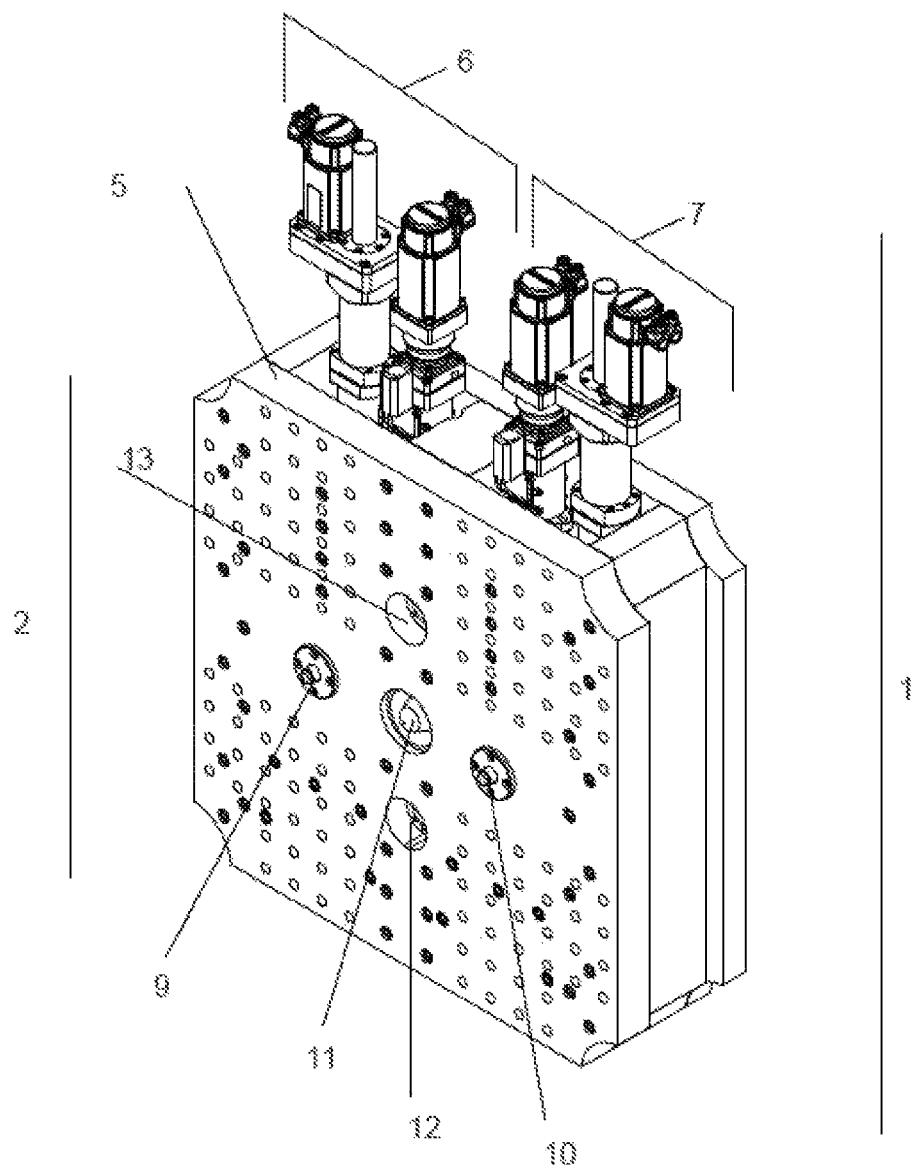
FIG. 1 is a front perspective view of the Additional Injection Modular System with two additional injection points, wherein reference numbers represent:
1—additional injection modular system;
2—structure;
5—front mold clamping plate;
6—additional injection assembly for polymer component B;
7—additional injection assembly for polymer component C;
9—injection nozzle for polymer component B;
10—injection nozzle for polymer component C;
11—injection nozzle extension for polymer component A;
12—alternative housing for the installation of the injection nozzle assembly for polymer component;
13—alternative housing for the installation of the injection nozzle assembly for polymer component.
Figure 14:
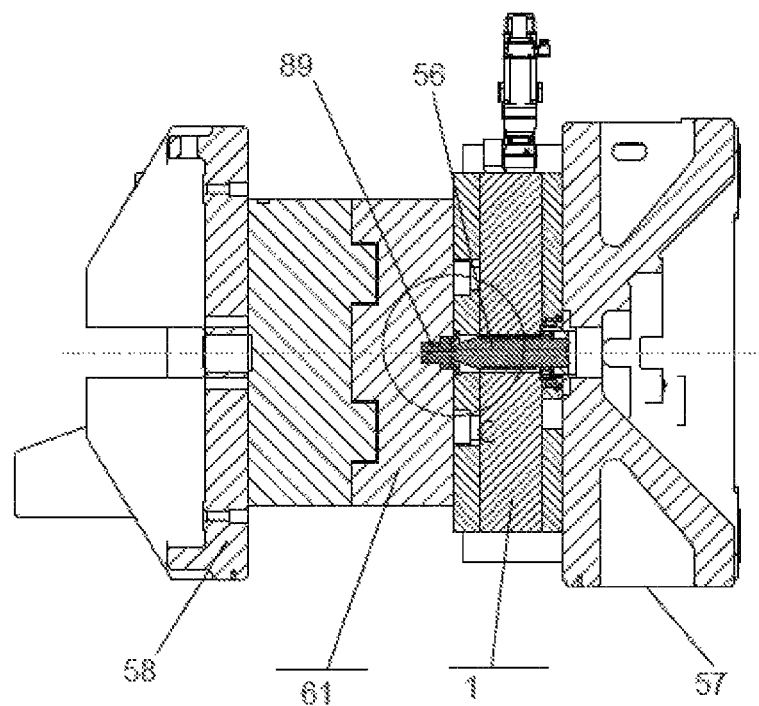
Figures 1, 14:
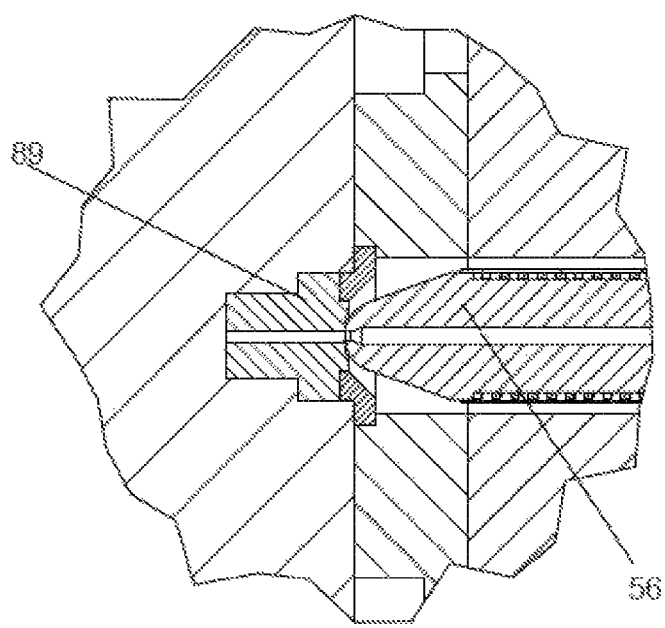
Figure 15:
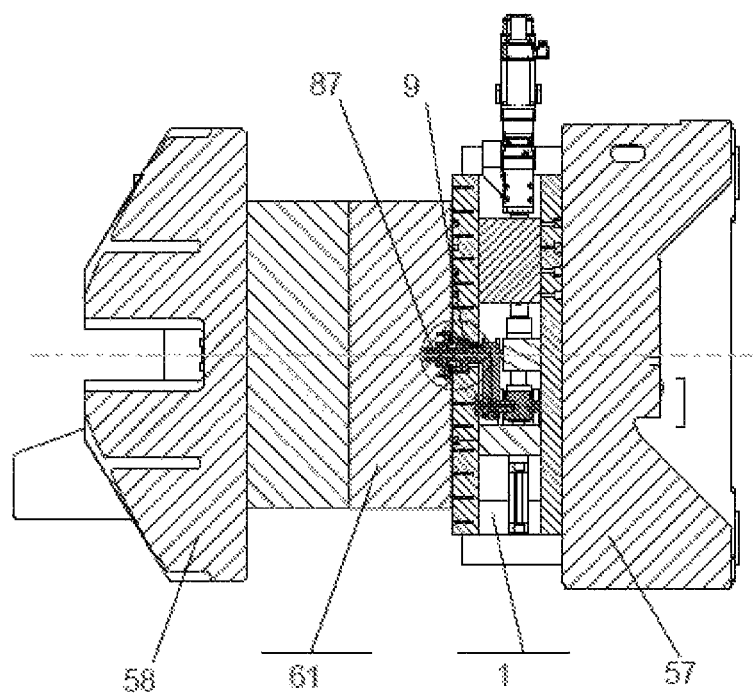
Figures 1, 15:
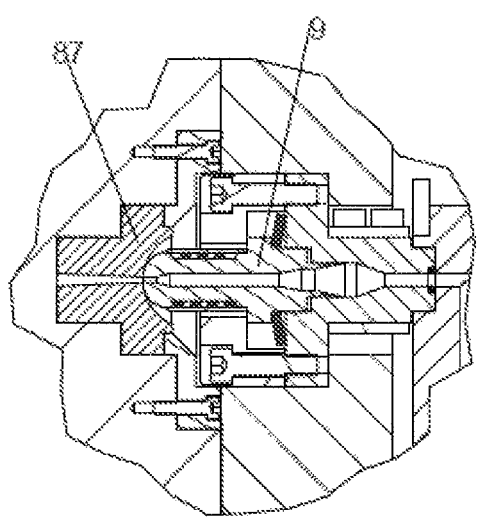

FIG. 14 is a section view along the plane defined by main injection between the injection machine plates of the additional injection modular system, wherein reference numbers represent:

1—additional injection modular system;
56—injection nozzle extension for polymer component A;
57—stationary plate of the main injection machine;
58—movable plate of the main injection machine;
61—mold;
89—inlet ring for polymer component A main injection into the mold;

FIG. 14-1 is a magnified view of FIG. 14, that is, of main injection nozzle extension assembly, wherein reference numbers represent:

56—injection nozzle extension for polymer component A;
89—inlet ring for polymer component A main injection into the mold;

FIG. 15 is a section view of the additional injection nozzle assembly, wherein reference numbers represent:

1—additional injection modular system;
9—injection nozzle for polymer component B;
57—stationary plate of the main injection machine;
58—movable plate of the main injection machine;
61—mold;
87—inlet ring for polymer component B injection into the mold;

FIG. 15-1 is a magnified view of FIG. 15, showing the mounting detail of the additional injection nozzle system, wherein reference numbers represent:

9—injection nozzle for polymer component B;
87—inlet ring for polymer component B injection into the mold.

Figure 16:
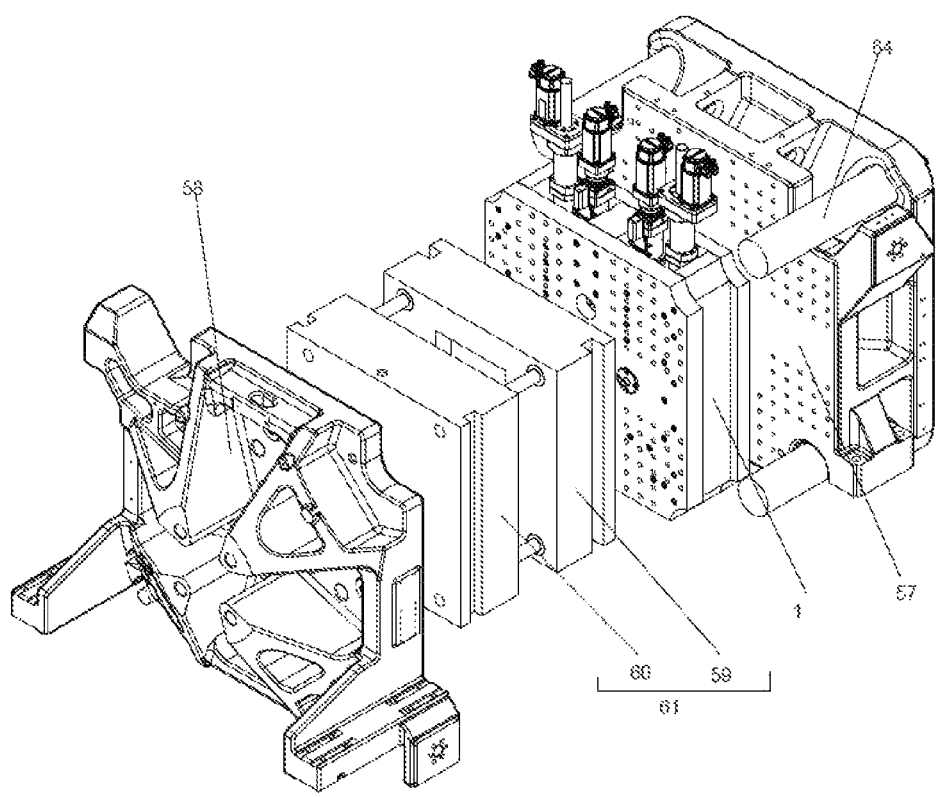

FIG. 16 shows a way of assembling the additional injection modular system, together with a mold between the plates of the closure assembly of a base injection machine, wherein reference numbers represent:

1—additional injection modular system;
57—stationary plate of the main injection machine;
58—movable plate of the main injection machine;
59—stationary plate side of part of the mold;
60—movable plate side of part of the mold;
61—mold;
64—main injection machine columns.

Figure 17:
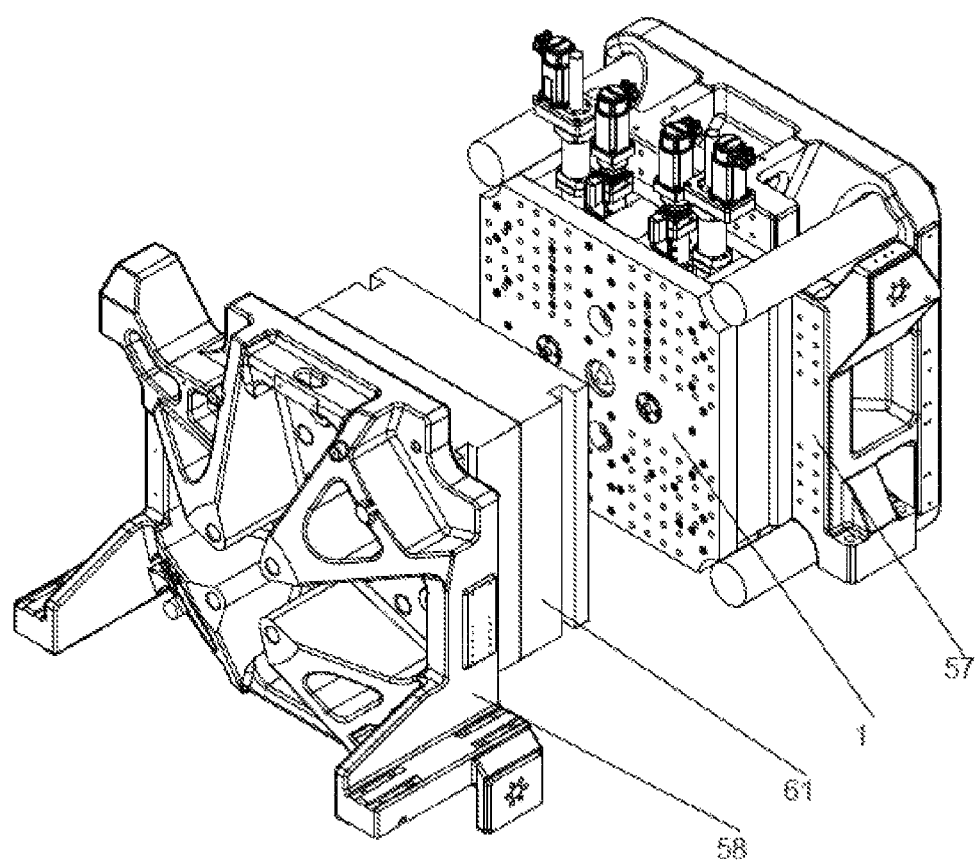
Figure 18:
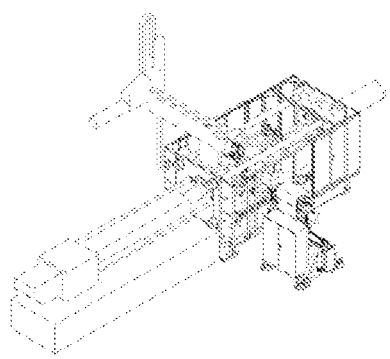
Figure 18:
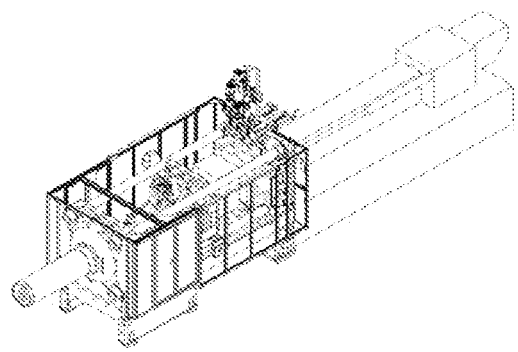
Figure 18:
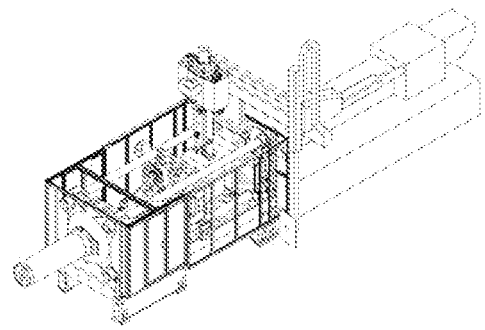
Figure 18:
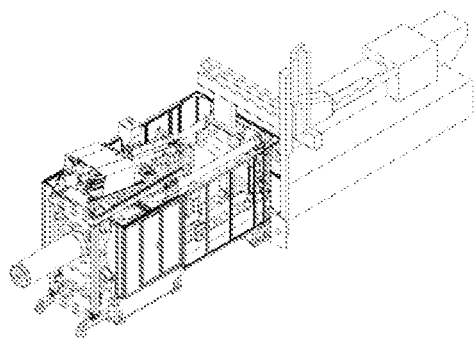

FIG. 17 shows a mounting technique similar to that in FIG. 16 with the mold and modular system properly set to plates of the machine closure assembly, in open mold phase, wherein reference numbers represent:

1—additional injection modular system;
57—stationary plate of the main injection machine;
58—movable plate of the main injection machine;
61—mold;

FIG. 18 shows four (A, B, C, D) possible mounting examples of additional injection system solutions.

DESCRIPTION OF THE EMBODIMENTS

The description of the technology is made using the embodiments illustrated in the figures and elements contained therein in order to simplify the description, interpretation of operation and scope of application thereof. However the present specification is merely representative of one of the possible compositions, sizes and arrangement of components integrated in the system. Indeed, the composition, size and arrangement of said elements shall be tailored to specific qualitative and quantitative requirements of the additional injection system required by each production.

The terms and designations used in the descriptive text correspond to the most common in the industry and injection molding technology for polymer materials.

This description will not be limited by theory related to the different scientific and technological fields related to injection molding.

The present application describes an additional injection modular system comprising a modular unit for applying additional injections in part production injection systems requiring simultaneous or sequential injection of several details with the same material or with different materials on the same part, in processes generally designated as multicomponent injection. For the sake of description and illustration of the system herein disclosed, a case of two additional injection points is considered, which however are not intended to limit the scope of the present application.

The system herein presented consists of and will act as a module which will engage to injection molds or machines having multiple injection needs by providing and integrating all additional injection devices.

Thus, the same module may be used in various machines or molds, it being required that injection inlets into the molds are compatible with the placement of additional injection outlets and through point of the main injection existing in the structure.

The additional injection modular system includes, according to specified requirements, plasticizing and injection units suitable for additional injection needs required by the molding process, which may be combined together to achieve differentiated plasticizing times, injection volumes or injection rates.

The additional injection modular system has been designed to be compatible with the dimensional requirements of closure assemblies in injection molding machines as defined in EUROMAP and SPI standards, in order to provide a system of easy mounting and dismounting, while being compact and providing the best mechanical stability conditions.

Figure 2:
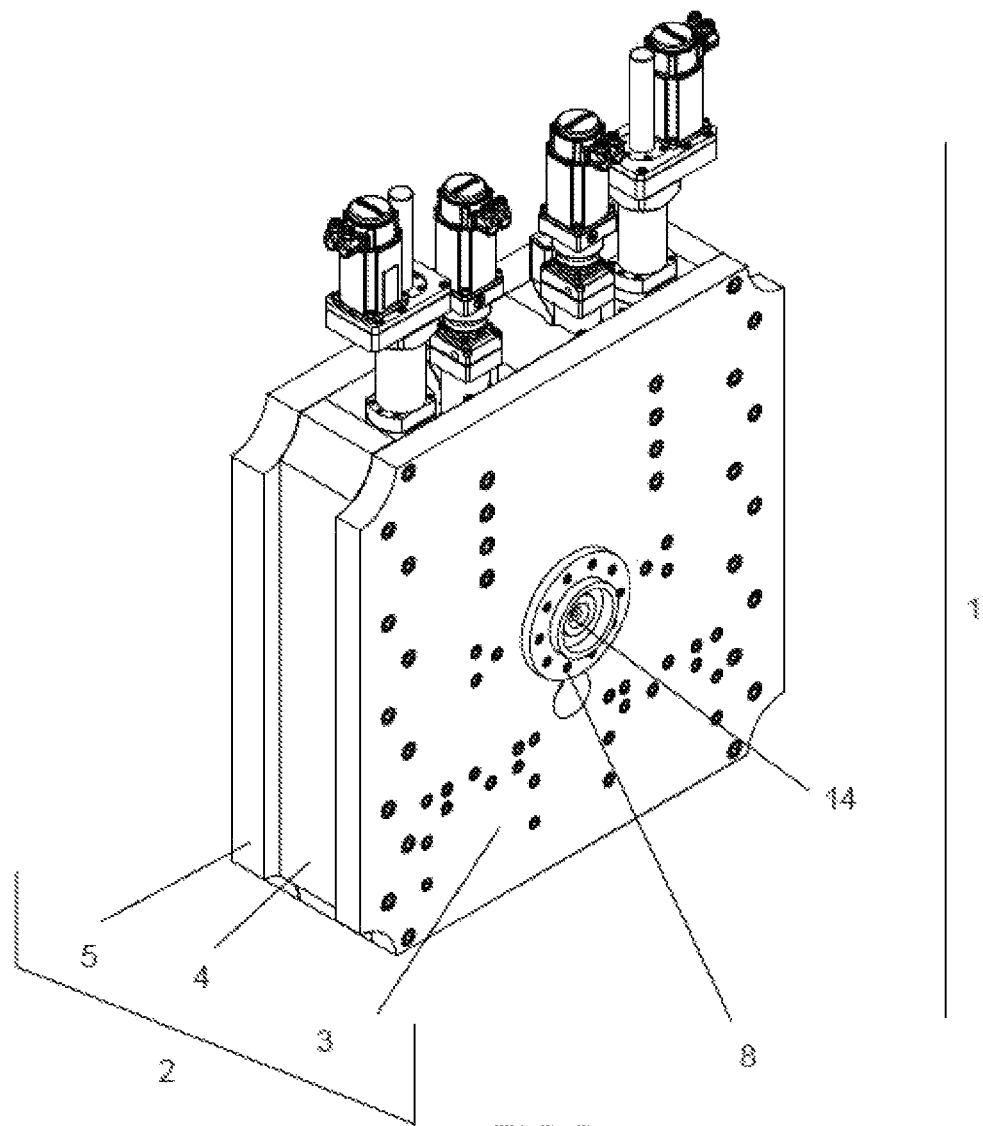
FIG. 2 is a rear perspective view of the additional injection modular system with two additional injection points, wherein reference numbers represent:
- 1—additional injection modular system;
- 2—structure;
- 3—structure clamping plate;
- 4—structure spacer block assembly;
- 5—front mold clamping plate;
- 8—system centering ring;
- 14—nozzle extension inlet.

FIGS. 1 and 2 show an embodiment of the additional injection modular system, in perspective with front and rear view respectively. The system consists of a module comprising a metal structure (2), which will contain a set of devices or components for processing secondary or additional injections of, or together with, the injection carried out by the main injection machine which shall process the main polymer component, hereinafter designated polymer A, which is generally the one constituting the largest part of the molded part.

FIG. 1 shows a module comprising in its structure (2), for example, two additional injection assemblies consisting of an additional injection assembly for polymer component B (6) and an additional injection assembly for polymer component C (7).

The main polymer component A is injected by the injection assembly of the main machine through the injection nozzle extension for polymer component A (11). In the example included in the present description, the inlet of said extension is arranged at the center of the structure clamping plate (3) which is normally centered, by the system centering ring (8), and coincident with the existing injection through bore in the stationary plate of the main injection machine (57) as shown in FIGS. 14 and 17.

The output of the injection nozzle extension for polymer component of A (11) is arranged in the center of the front mold clamping plate (5) on the structure (2), but this possible position is not mandatory.

Plasticized or molten materials in the additional injection assemblies are injected into the mold through the injection nozzle for polymer component B (9) and injection nozzle for polymer component C (10), respectively.

Figure 3:
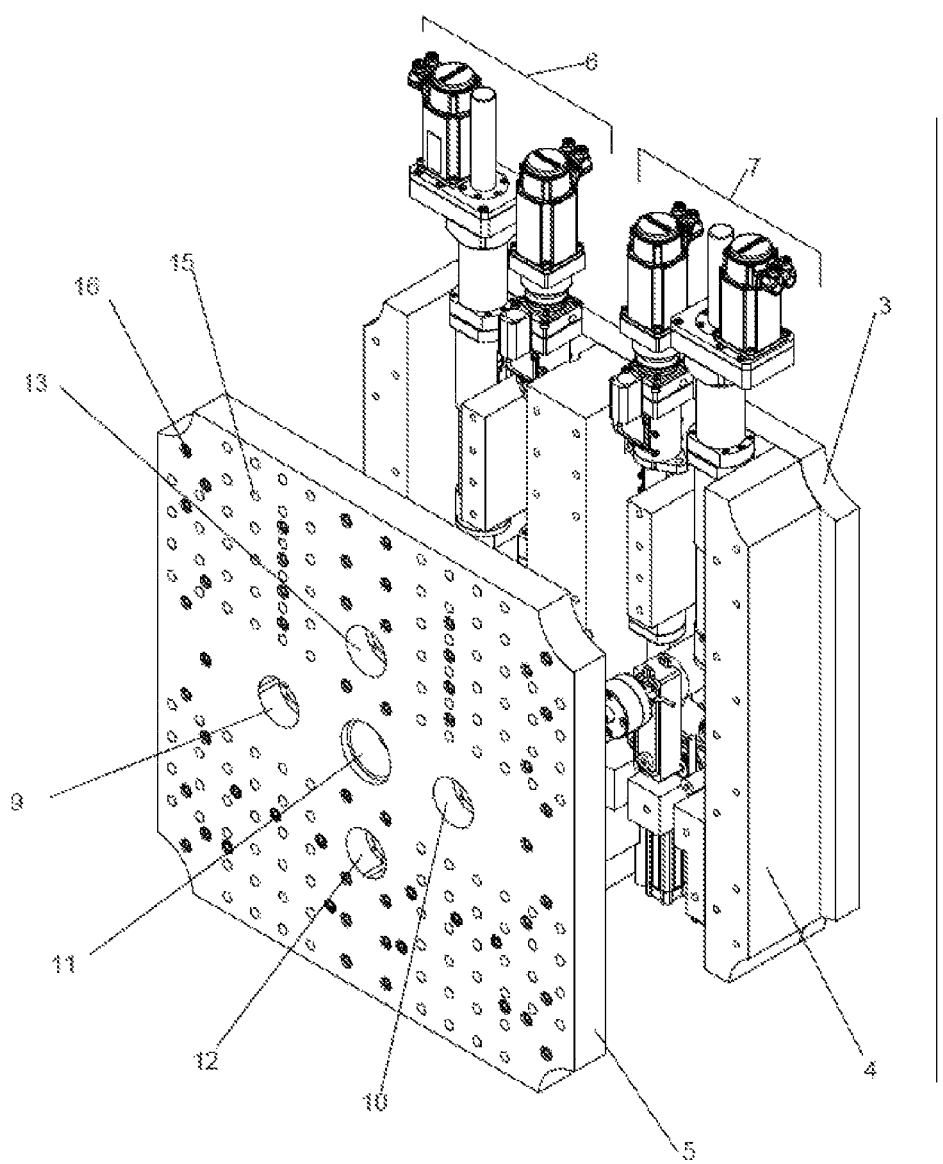
FIG. 3 shows the additional injection modular system with two additional injection points, with unscrewed front plate, thus revealing the inside thereof where the additional plasticizing and injection systems are installed, wherein reference numbers represent:
- 1—additional injection modular system;
- 3—structure clamping plate;
- 4—structure spacer block assembly;
- 5—front mold clamping plate;
- 6—additional injection assembly for polymer component B;
- 7—additional injection assembly for polymer component C;
- 9—injection nozzle for polymer component B;
- 10—injection nozzle for polymer component C;
- 11—injection nozzle extension for polymer component A;
- 12—alternative housing for the installation of the injection nozzle assembly for polymer component;
- 13—alternative housing for the installation of the injection nozzle assembly for polymer component;
- 15—mold clamping holes with Euromap size and distribution;
- 16—screws for clamping the front mold clamping plate.

The module structure consists of two plates, the structure clamping plate (3) and the front mold clamping plate (5), between which a structure spacer block assembly (4) is interposed. The structure clamping plate (3) will support the attachment of the additional injection modular system (1) by means of clamps or devices for the purpose on the stationary plate of the main injection machine (57), as shown in FIG. 3.

Positioning the additional injection modular system (1) is carried out by means of the system centering ring (8) fitted in the center bore of the stationary plate of the main injection machine (57). Through this central bore, the injection nozzle of the main injection machine is abutted to the inlet of the injection nozzle extension (14), through which the main polymeric material injection A is performed.

The structure spacer block assembly (4) shall be positioned and fastened to the structure clamping plate (3) or, in some cases, shall be integral therewith, forming one single piece, and forming a set of columns where the front mold clamping plate (5) shall be clamped, wherein the mold (61) shall be clamped to the additional injection modular system (1).

In free voids between the structure spacer block assembly (4) and the structure clamping plate (3) and the front mold clamping plate (5), additional assemblies for polymer components B and C injection are housed, as well as the hot dispensing channel assembly to enable guiding the molten material to the injection points through the injection nozzle for polymer component B (9) and injection nozzle for polymer component C (10). Alternatively and through dispensers with different design it would be possible, if necessary, to choose other points of alternative housing for the installation of additional injection nozzle assemblies, as well as of the polymer component A primary injection, by means of the injection nozzle extension for polymer component A (11) of different design and with a different route.

Each model of the additional injection modular system (1) will have obstruction dimensions compatible with standards for distance between columns and size of mold mounting bores on the stationary plate of the main injection machine (57) and on the movable plate of the main injection machine (58) so as to be compatible with sizes set forth by EUROMAP standards (Europe's Association for Plastics and Rubber machinery manufacturers) and SPI (Society of the Plastics Industry, Standards USA).

The front mold clamping plate (5) can be in accordance with said standards and with the definition of the centers of installation points of polymer components B and C injection assemblies, as well as the center of the injection nozzle extension housing for polymer component A (11), as illustrated in FIG. 1, thus allowing the mold designer to choose the best positioning solution of these injection points and design the hot channel system dispensing the material into the mold without worrying about mounting details of additional secondary injection elements.

So being, during mold design, the designer shall select the modular system with the necessary additional plasticizing and injection capacities. The position of the additional injection points provided in the additional injection modular system model (1) selected, will form the basis for defining the system of hot mold channels, from inlet points of the additional secondary injection to the injection nozzles for molding openings.

FIGS. 16 and 17 illustrate the mounting of a mold (61) installed with an additional injection modular system (1) between the stationary plate of the main injection machine (57) and the movable plate of the same main injection machine (58). The additional injection modular system (1) is clamped to the stationary plate of the main injection machine (57), by means of conventional clamping systems using existing bores in the same plate. In other possible injection molding systems, the attachment of additional injection modular system (1) can be done on the movable plate of the main injection machine (58), or even interposed between the mold bodies.

The mold (61) shall in turn be positioned so as to be guided by the existing rings in the main and additional injection points using the clamping standard bores in the front mold clamping plate (5), as illustrated in FIGS. 1 and 3.

FIG. 3 shows the additional injection modular system (1), opened with its front mold clamping plate (5) detached after loosening the elements of mechanical connection, such as bolts, which connect the plate to the structure spacer block assembly (4). In the same FIG. 3 the additional injection assemblies are shown, for example, polymer component B injection assembly (6) and polymer component C injection assembly (7) installed in voids provided between the structure spacer block assembly (4) and the plates-structure clamping plate (3) and front mold clamping plate (5).

Figure 4:
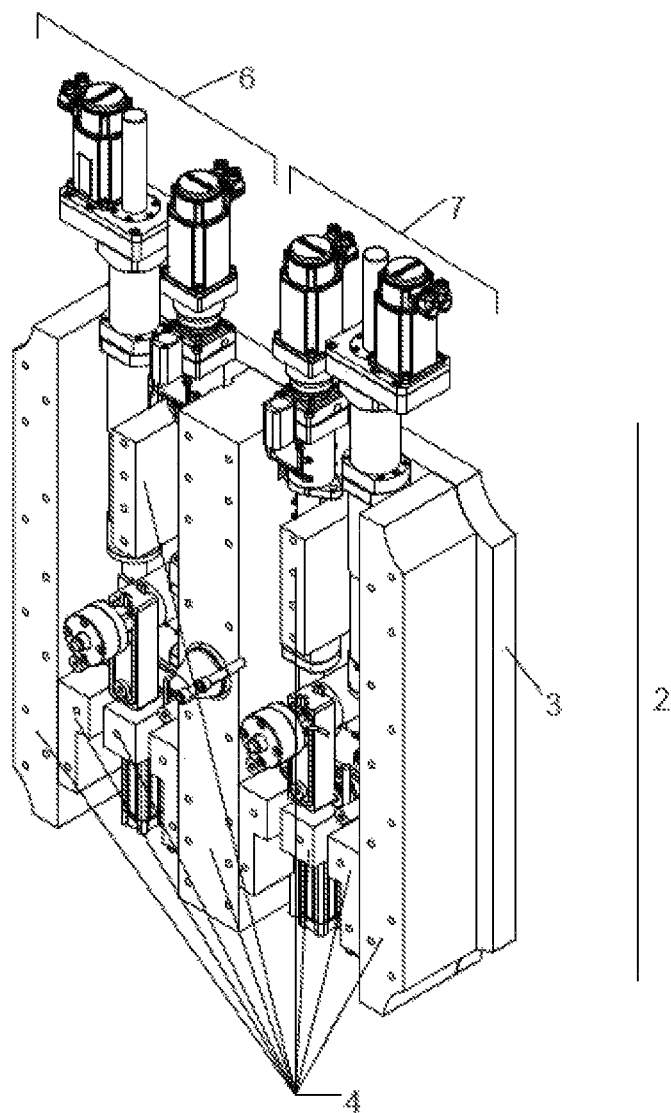
FIG. 4 shows the installation of the elements fully housed within the additional injection modular system with two additional injection points, with no front mold clamping plate, wherein reference numbers represent:
- 2—structure;
- 3—structure clamping plate;
- 4—structure spacer block assembly;
- 6—additional injection assembly for polymer component B;
- 7—additional injection assembly for polymer component C.

FIG. 4 shows the same assembly built-in the structure spacer block assembly (4). In some designs of additional injection modular systems (1), the structure spacer block assembly (4) and the structure clamping plate (3) may be a single piece, with the voids for installing injection assemblies and respective dispensers, machined in a single original steel block.

Figure 5:
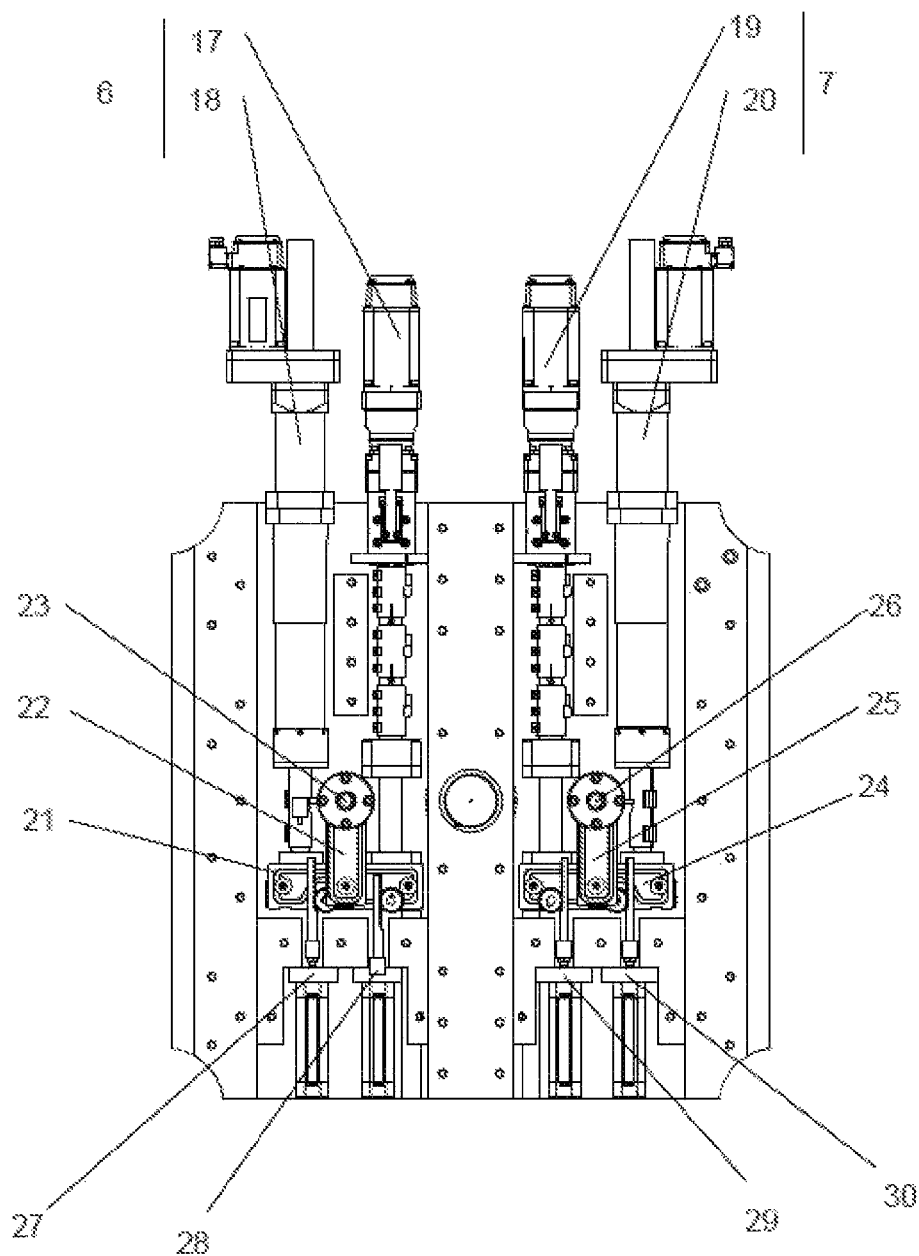
FIG. 5 shows an embodiment of a set of elements necessary to perform two-point additional injection, wherein reference numbers represent:
- 6—additional injection assembly for polymer component B;
- 7—additional injection assembly for polymer component C;
- 17—additional extruder for polymer component B;
- 18—additional injection unit for polymer component B;
- 19—additional extruder for polymer component C;
- 20—additional injection unit for polymer component C;
- 21—additional dispenser block for polymer component B;
- 22—polymer component B dispenser;
- 23—injection nozzle assembly for polymer component B;
- 24—additional dispenser block for polymer component C;
- 25—polymer component C dispenser;
- 26—injection nozzle assembly for polymer component;
- 27—injection valve assembly for polymer component B;
- 28—cleaning valve assembly for polymer component B;
- 29—injection valve assembly for polymer component C;
- 30—cleaning valve assembly for polymer component C.

The set of equipment that can be installed in the module is illustrated in FIGS. 5 and 6. In FIG. 6, the equipment taken as an example of composition of the additional injection modular system (1) is shown without being housed between the structure blocks (2).

The additional injection assembly for polymer component B (6) consists of an additional extruder for polymer component B (17) and an additional injection unit for polymer component B (18) of the piston accumulator type. These two components are connected to an additional dispenser block for polymer component B (21), in which the polymer material B, plasticized in the extruder is fed under controlled volume into the additional injection unit for polymer component B (18), through hot channels, being subsequently injected by the injection unit, after being guided through the additional dispensing block for polymer component B (21) into the additional injection point for material B, by means of the injection nozzle assembly for polymer component B (23), in which the injection nozzle for polymer component B (9) is integrated.

The flow direction of the material plasticized in the additional extruder for polymer component B (17) towards the additional injection unit for polymer component B (18) and therefrom to the injection nozzle assembly for polymer component B (23) is carried out by an injection valve assembly for polymer component B (27) integrated into the additional dispenser block for polymer component B (21).

A second valve designated polymer component B cleaning valve (28) is intended to deflect the material within the extruder to a cleaning discharge pipe B (31) to the outside of the module, whenever necessary to clean the system in order to change material, such as polymer type or color, or degradation of polymer material, in this case polymer material B.

The additional injection assembly for polymer component C (7) is carried out similarly by means of an additional extruder for polymer component C (19), by an additional injection unit for polymer component C (20), by an additional dispenser block for polymer component C (24), which contains a further polymer component C injection valve assembly (29) and a further polymer component C cleaning valve assembly (30), and a further cleaning discharge pipe C (32). This injection assembly shall inject polymer component C through polymer component C dispenser C (25) and injection nozzle assembly for polymer component C (26), in which the injection nozzle for polymer component C (10) is installed.

The additional injection assembly for polymer component B (6) and the additional injection assembly for polymer component C (7) may have different characteristics, i.e. may be of different productive capacities and other processing and dimensional characteristics, depending on the material meant to be processed and on volumes involved in each additional injection.

In the embodiment shown, each additional injection unit consists of an extruder to plasticize and a piston-type injection unit for dosing and high pressure injection. However, aggregation of a piston injection unit to each of the incorporated extruders shall only be necessary if injection accuracy is so required, whereas in other cases only one or more extruders may be used without an injection unit. In this case, each extruder will be equipped with an actuating device enabling the axial movement of the spindle in order to perform the desired dosing and injection.

Figure 7:
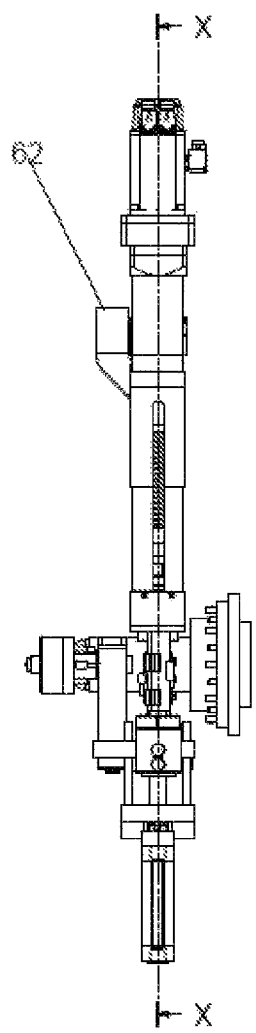
FIG. 7 is a side view of FIG. 6, wherein the reference number represents:
- 62—polymer material B feeding.

FIG. 7 shows the material inlet in the extruders by feeding polymer material B (62) or feeding polymer material C, which will be arranged at the upper face level of the structure (2) and on which discharge nozzles of the respective material storage hoppers shall be connected.

Figure 8:
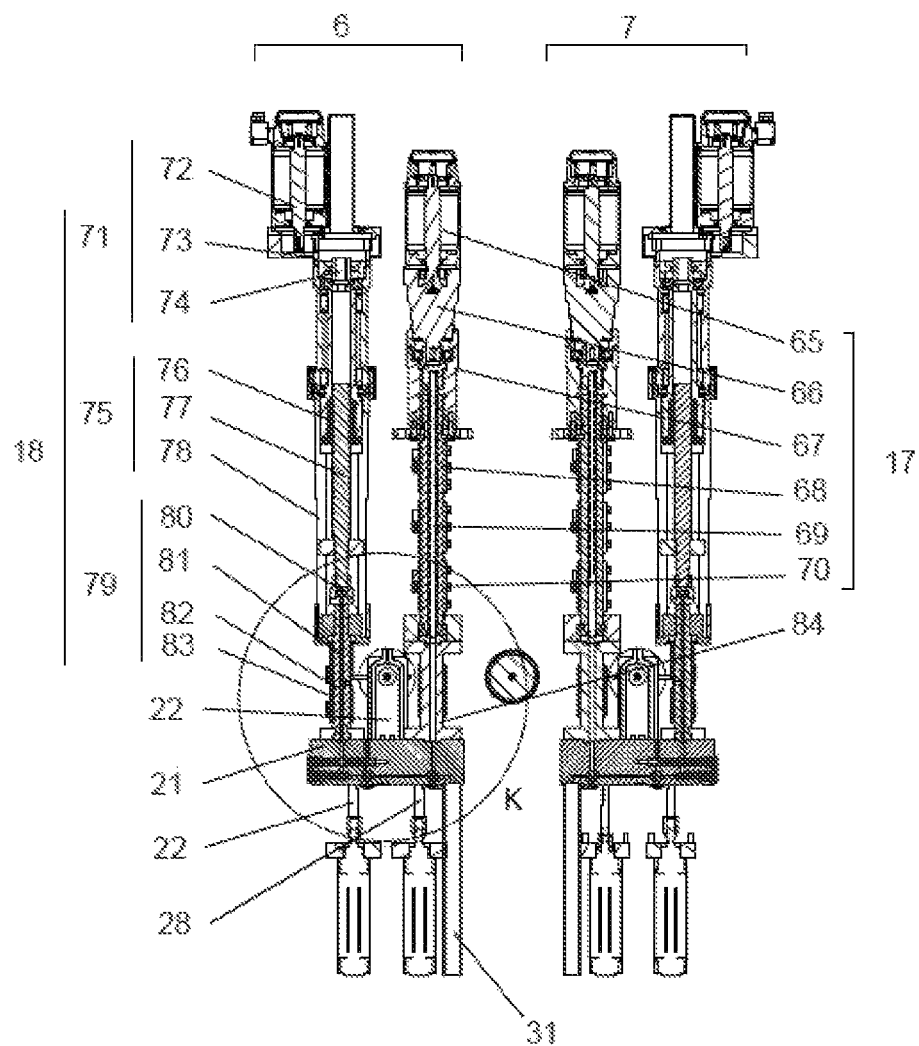
FIG. 8 is a section view along the plane X-X in FIG. 6, shown in the side view in FIG. 7, wherein reference numbers represent:
- 6—additional injection assembly for polymer component B;
- 7—additional injection assembly for polymer component C;
- 17—additional extruder for polymer component B;
- 18—additional injection unit for polymer component B;
- 21—additional dispenser block for polymer component B;
- 22—polymer component B dispenser;
- 28—cleaning valve assembly for polymer component B;
- 31—cleaning discharge pipe B;
- 65—additional extruder motor;
- 66—additional extruder gearbox;
- 67—axial load support bearing housing and spindle rotation support;
- 68—additional extruder chamber;
- 69—additional extruder spindle;
- 70—heating resistors of the additional extruder chamber;
- 71—actuator of the additional injection unit for polymer component B;
- 72—servo motor;
- 73—gearbox;
- 74—axial bearing assembly;
- 75—actuating linear system for injection accumulator piston;
- 76—ball nut;
- 77—ball screw;
- 78—linear guiding system;
- 79—piston accumulator of component injection assembly;
- 80—injection pressure load cell;
- 81—accumulator chamber of additional injection unit;
- 82—accumulator piston of additional injection unit;
- 83—heating resistors;
- 84—pipe for connecting extruder to dispenser block.

FIG. 8 corresponds to the sectional view of the components integrated in the system, through plane X-X in FIG. 7.

Additional injection assemblies for polymer component B (6) and polymer component C (7) can be similar.

The extruders of each additional injection assembly for polymer component B (6), and similarly the extruder of each additional injection assembly for polymer component C (7) consist of: an additional extruder motor (65) an additional extruder gearbox (66), an axial load bearing housing and spindle rotation support (67), where the support bearings and absorption of axial load generated in the plasticizing assembly are installed, which consist of an additional extruder chamber (68) and an additional extruder spindle

(69) of the Archimedes type. In the extruder, the material originally in the form of solid granules, is melted by friction generated by the action of the spindle against the walls of the chamber and is pumped in order to load the piston accumulator of the component injection assembly (79) of the additional polymer component injection unit (18).

Each additional injection unit for polymer component (18) consists of a piston accumulator, which in turn comprises a chamber with a cylindrical bore and a piston. In the filling phase of the accumulator, the cylindrical hole is loaded with molten material delivered by the additional extruder for polymer component B (17) and when the loaded volume is the volume desired injection volume, piston discharges the accumulator by sending the molten material to the injection point. The piston movement is performed by an actuating linear system for injection accumulator piston (75) consisting of a ball screw (77) and a ball nut (76) fitted in a linear guiding system (78). In the connection of the linear guiding actuating system with the piston there is an injection pressure load cell (80) for measuring strength and thus the injection pressure necessary for the secondary additional injection process. The molten material discharged from the accumulator is sent through the additional dispenser block for polymer component B (21) for the polymer component dispenser (22), and therefrom to the secondary injection point.

Figure 9:
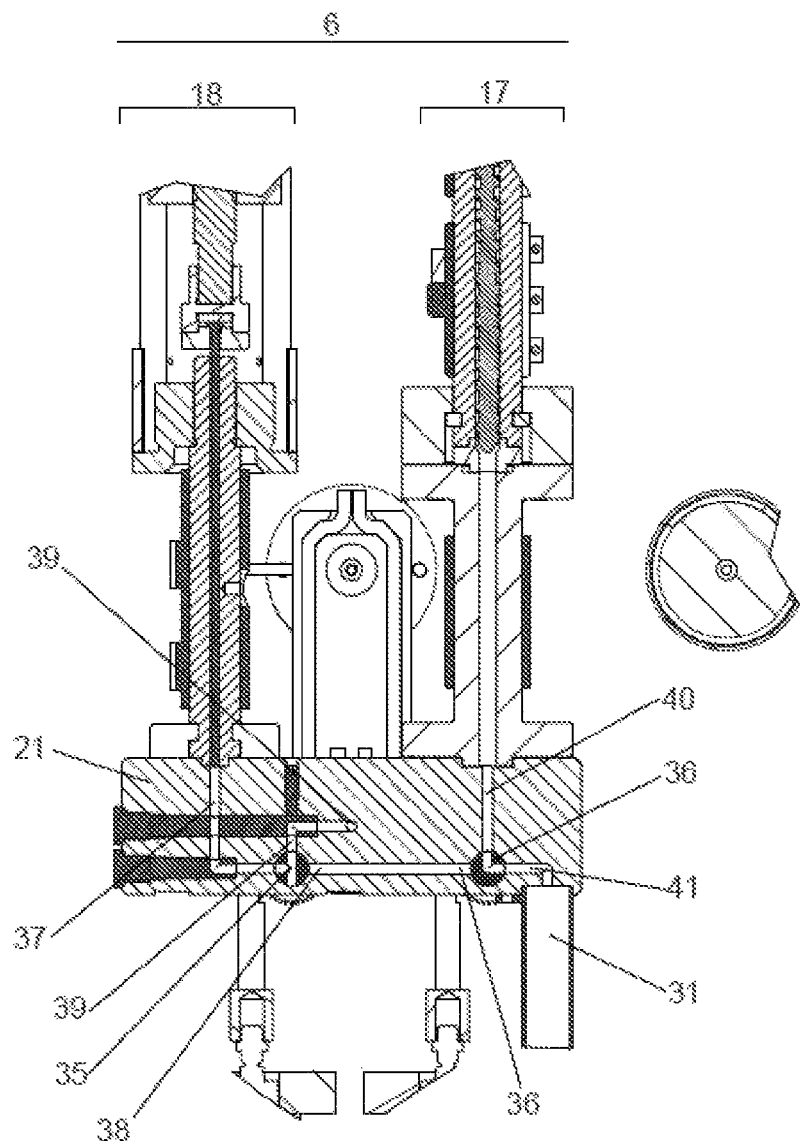
FIG. 9 shows a section detail of an embodiment of the control dispenser operating diagram of the additional injection cycle, wherein reference numbers represent.

FIG. 9 shows an embodiment of the additional dispenser block for polymer component B (21). This block has an injection cycle 3-way valve installed for molten polymer, being rotary and whose injection cycle valve rotor (35) has radial bores allowing, according to its angular position, the communication of the extruder outlet dispensing channel (40) through the extruder outlet dispensing channel for the injection cycle valve (38) to the chamber in the additional injection unit accumulator for polymer component B (18), in the charging phase thereof. Subsequently, in the injection phase of the additional injection cycle and with the change of rotor position into another position, designated injecting position, the discharge from the accumulator and consequently sending the molten material to the dispenser through the additional injection outlet dispensing channel (39).

The operation of the injection cycle valve and consequent angular positioning of the respective rotor, depending on the operation cycle of the accumulator and extruder for additional injection is performed by means of a pinion system which is solidary, rotation pinion of the additional injection cycle valve (42) and rotation rack of additional injection cycle valve (43). In order to balance the rotor torsional moment, it is triggered by two pinions and two racks applied on both ends of the rotor support.

The simultaneous and linear movement of the racks between points corresponding to both rotor positions is performed by means of an actuator, in the case of FIG. 10, a pneumatic or hydraulic cylinder-type actuator.

The operation of the cleaning valve, whose rotor may be seen in FIGS. 9 and 10, has two positions, where in one position, the extruder outlet dispensing channel (40) is connected to the extruder outlet dispensing channel for the injection cycle valve (38) in order to undertake the load of the accumulator when the rotor valve is in the corresponding position, it being performed by a similar system of cleaning valve rotation pinion (45) with a set of cleaning valve rotation racks (46) actuated by a cleaning valve rotation actuator (47).

In the second position, the cleaning valve rotor interrupts the connection of the extruder outlet dispensing channel (40) with the extruder outlet dispensing channel for the injection cycle valve (38) and the connection to the cleaning discharge dispensing channel (41) to the cleaning discharge pipe B (31) is set, as shown in FIGS. 8 and 9.

The additional injection assembly for polymer component C (7) comprises another additional dispenser block for polymer component C (24), whose composition including the injection valve assembly for polymer component C (29) and the cleaning valve assembly for polymer component C (30) are similar in function and composition.

FIG. 11 shows the connection of the additional dispenser block for polymer component B (21) to the polymer component B dispenser (22), and therefrom to the injection nozzle for polymer component B (9) integrated in the injection nozzle assembly for polymer component B (23).

The injection nozzle assembly for component B (23) consists of a hot nozzle support for secondary polymer component injection (50) heated by a heating resistor. On this support the injection nozzle for polymer component B (9) is installed. The mounting of the injection nozzle in the housing bore in the supporting part has a spring or set of springs interposed and is closed by the secondary injection nozzle centering ring (53). This arrangement allows the additional injection nozzle to move axially within certain limits, in the hot nozzle support for secondary polymer component injection (50). This arrangement also enables the injection nozzle to adapt to pressure on the inlet ring for polymer component B injection into the mold (87), as shown in FIG. 15.

FIG. 12 is a section along axis W-W in FIG. 6 and shows the assembly of additional injection nozzle assemblies for polymer components A and B, connected to additional dispenser blocks for polymer components B and C through polymer component B and C dispensers. The connection of the dispensers to the respective dispenser blocks is carried out by connecting pipes.

FIG. 13 shows a section of the system mounting along plane Y-Y in FIG. 6, detailing the mounting of the injection nozzle extension for polymer component A (11) consisting of: system centering ring (8), injection nozzle extension support for polymer component A (54), pre-tensioning spring of injection nozzle extension for polymer component A (55) and injection nozzle extension for polymer component A (56). This mounting ensures that, as shown in FIGS. 14 and 14-1, after clamping the mold (61) on the additional injection modular system (1), there is a good seal on the injection nozzle extension abutment for polymer component A (56) with the inlet ring of the main injection with polymer component A into the mold (89), with the thermal expansion compensation required.

As shown in FIGS. 14, 14-1, 15 and 15-1, the clamping of the mold (61) to the additional injection modular system assembly (1), in conjunction with construction details of the assemblies, ensures the seal between the abutment thereof and corresponding injection inlet rings in the mold (61).

The present embodiment is of course in no way restricted to the embodiments herein described and a person of ordinary skill in the art will be capable of providing many modification possibilities thereto without departing from the general idea of the invention as defined in the claims.

All embodiments described above are obviously combinable with each other. The following claims define further preferred embodiments.

The invention claimed is:
1. A modular system for providing additional injection units for an injection machine, the modular system comprising:

a first clamping plate adapted to be coupled to an injection machine, on one of a stationary plate of an injection machine and a movable plate of the injection machine;

a second clamping plate adapted to be coupled to a mold;

an injection nozzle extension having a first end and a second end, wherein:

the first end is disposed on the first clamping plate and is adapted to be coupled to the injection machine and to receive a first material from the injection machine and allow the first material to pass through the injection nozzle to the second end; and the second end is disposed on the second clamping plate and is adapted to be coupled to an inlet of the mold and to inject the first material into the mold; and an additional assembly disposed between the first clamping plate and the second clamping plate, the additional assembly being coupled to the first clamping plate, the additional assembly comprising at least one second nozzle adapted to inject at least one second material into the mold.

2. The modular system according to claim 1, wherein the first clamping plate is disposed in one of the following arrangements: clamped to a stationary plate of the injection machine, clamped to a movable plate of the main injection machine, interposed between the injection machine and the mold, and interposed between the mold and a second mold.

3. The modular system according to claim 1, wherein the second clamping plate includes a plurality of holes adapted to facilitate attachment of the second clamping plate to the mold in accordance with standards for injection machinery plates.

4. The modular system according to claim 2, wherein the first clamping plate is clamped to the stationary plate of the injection machine, and the first clamping plate is adapted to facilitate attachment of the modular system to one of the stationary plate of the injection machine and the movable plate of the injection machine, and to center the modular system relative to the stationary plate of the injection machine.

5. The modular system according to claim 1, wherein the first end of the injection nozzle extension is arranged centrally in the first clamping plate.

6. The modular system according to claim 1, wherein the additional assembly includes an extruder, the extruder comprising:

an additional extruder motor;

an additional extruder gearbox;

an axial load support bearing housing and spindle rotation support; and an additional extruder spindle.

7. The modular system according to claim 1, wherein the injection nozzle extension further comprises:

a system centering ring adapted to fit in a center bore of the stationary plate of the injection machine;

a support for the injection nozzle extension; and a pre-tensioning spring.

8. The modular system according to claim 1, further comprising a mounting for the at least one second nozzle, wherein the mounting for the additional nozzle comprises a spring and is adapted to be closed by a secondary injection nozzle centering ring, wherein the at least one second nozzle is adapted to move axially.

9. The modular system according to claim 1, further comprising:

a second additional assembly comprising a third nozzle adapted to inject a third material into the mold.

10. The modular system according to claim 9, wherein the at least one second nozzle and the third nozzle are arranged symmetrically on first and second sides of the second end of the injection nozzle extension.

11. A modular system for providing additional injection units for an injection machine, the modular system comprising:

a first clamping plate adapted to be coupled to an injection machine;

a second clamping plate adapted to be coupled to a mold; and an assembly comprising a nozzle adapted to inject a selected material into the mold.

12. A modular system for providing additional injection units for an injection machine, the modular system comprising:

a first clamping plate adapted to be coupled to a first mold;

a second clamping plate adapted to be coupled to a second mold; and an assembly comprising a nozzle adapted to inject a selected material into the first and second molds.

* * * * *